United States Patent [19]
Loeffler

[11] Patent Number: 5,704,252
[45] Date of Patent: Jan. 6, 1998

[54] COMPACT SHIFT ASSEMBLY WITH INTERLOCK

[75] Inventor: John M. Loeffler, Toledo, Ohio

[73] Assignee: Dana Corporation, Toledo, Ohio

[21] Appl. No.: 537,108

[22] Filed: Sep. 29, 1995

[51] Int. Cl.[6] .................................................. G05G 9/00
[52] U.S. Cl. ........................ 74/477; 74/483 R; 74/475; 74/473 R
[58] Field of Search ........................... 74/473 R, 475, 74/477, 483 R

[56] References Cited

U.S. PATENT DOCUMENTS

| | | |
|---|---|---|
| 2,344,096 | 3/1944 | Kummich . |
| 4,320,670 | 3/1982 | Kawamoto . |
| 4,377,951 | 3/1983 | Magg et al. . |
| 4,430,904 | 2/1984 | Fogelberg . |
| 4,539,859 | 9/1985 | Arai et al. . |
| 4,621,537 | 11/1986 | Piazza et al. ............ 74/473 R X |
| 4,656,886 | 4/1987 | Edwards ................. 74/473 R X |
| 4,709,793 | 12/1987 | Sakakibara et al. ....... 74/473 R X |
| 4,827,793 | 5/1989 | Loeffler et al. . |
| 4,852,421 | 8/1989 | Kerboul ................. 74/473 R X |
| 4,920,815 | 5/1990 | Reynolds ............... 74/473 R X |
| 5,036,721 | 8/1991 | Gugin ................... 74/473 R X |
| 5,203,225 | 4/1993 | Giusti . |

Primary Examiner—Richard M. Lorence
Assistant Examiner—David M. Fenstermacher
Attorney, Agent, or Firm—MacMillan, Sobanski & Todd

[57] ABSTRACT

A transmission includes an input shaft aligned along an axial direction and mounted for rotation, an output shaft, a plurality of gears selectively connectable between the input shaft and the output shaft for providing a plurality of gear ratios between the input shaft and the output shaft, and a plurality of shift rails movable in the axial direction to select various ones of the plurality of gears, the shift rails having connectors operable to move the shift rails in the axial direction. A shift member is mounted both for movement in the axial direction and for rotational movement about the axial direction, and an interlock is engageable by the shift member and mounted for rotation about the axial direction. The interlock is provided with a slot, so that rotation of the shift member rotates the interlock. Rotation of the interlock by the shift member enables the slot to index to a plurality of positions in alignment with the connectors, and alignment of the slot with one of the connectors enables the shift rail associated with that connector to be moved in the axial direction to select one of the plurality of gears.

19 Claims, 6 Drawing Sheets

COMPACT SHIFT ASSEMBLY WITH INTERLOCK

BACKGROUND OF THE INVENTION

This invention relates in general to vehicle transmissions and in particular to an improved system for shifting gears in a manual transmission.

In most vehicles, a transmission is provided in the output train between the engine and the drive wheels. As is well known, the transmission includes a housing containing an input shaft, an output shaft, and a plurality of meshing gears which are selectively connected between the input shaft and the output shaft. The meshing gears contained within the transmission housing are of varying size so as to provide a plurality of speed reduction gear ratios between the input shaft and the output shaft. By appropriate selection of these meshing gears, a desired speed reduction gear ratio can be obtained between the input shaft and the output shaft. As a result, acceleration and deceleration of the vehicle can be accomplished in a smooth and efficient manner.

Typically, this gear ratio selection is accomplished by moving one or more control members provided within the transmission. Typically, these control members include shift rails, clutch collars, and shift forks, all of which are positioned vertically above the remainder of the transmission apparatus. Movement of the control member causes certain ones of the meshing gears to be connected between the input shaft and the output shaft so as to provide the desired gear ratio. In a manual transmission, movement of the control member is normally accomplished by manual exertion by the vehicle operator, such as through a shift lever. In an automatic transmission, movement of the control member is normally accomplished by a pneumatic or hydraulic actuator in response to predetermined operating conditions.

One of the problems with manual transmissions is that the shift lever and control member extend a considerable distance vertically upward from the remainder of the transmission apparatus. This vertical extension can cause problems in the interior design of the vehicle, and it would be advantageous to have a transmission apparatus having a lower vertical profile above the input, main and output shafts, and the gears. One proposed solution to reduce the vertical extension of the control member is to provide shift rails which are not positioned directly above the remainder of the transmission apparatus, but are rather positioned off center and circumferentially spaced apart around the remainder of the transmission apparatus. This enables a lower vertical profile for the control member. In such a low profile transmission arms or connectors must be used to link the manual shift lever to the shift rails which are spread around the circumference of the transmission. These connectors must be capable of moving the various shift rails axially to engage selected gears. The shift selector apparatus must be capable of selecting any one of the shift rails for movement in the axial direction while preventing the remaining shift rails from moving in the axial direction.

SUMMARY OF THE INVENTION

There has now been developed a low profile transmission having circumferentially spaced apart shift rails and a control member which assures that only one shift rail, and therefore only one gear can be selected a one time. The apparatus of the invention provides a shift linkage and interlock mechanism which includes a shift member, such as a pawl, mounted both for movement in the axial direction and for rotational movement about the axial direction. An interlock is engageable by the shift member and mounted for rotation about the axial direction, and rotation of the shift member rotates the interlock. Preferably the pawl and the interlock are both mounted for rotation on an idler rail.

The interlock is provided with a slot, and rotation of the interlock by the shift member enables the slot to index to a plurality of positions in alignment with the connectors. Alignment of the slot with one of the connectors enables the shift rail associated with that connector to be moved in the axial direction to select one of the plurality of gears.

In a specific embodiment of the invention, the pawl has at least one tang engaging the slot in the interlock so that engagement of the tang with the slot causes the interlock to rotate upon rotation of the pawl. The interlock is preferably a generally cylindrical collar with the slot positioned on one face of the collar and extending along a diameter of the collar. The interlock preferably comprises a generally cylindrical shaft connected to the collar and mounted for coaxial rotation with the collar, where the slot extends entirely through the thickness of the collar and partially into the shaft.

The connectors have connector arms with brackets mounted at one end, and the prongs of the tangs connect with the bracket. Axial movement of the tang moves the bracket and connector arm axially, thereby moving the shift rail associated with the connector in an axial direction. Alignment of the slot with one of the connectors precludes the other connectors from being moved in the axial direction.

DETAILED DESCRIPTION OF THE PREFERRED EMBODIMENT

Figure 1:
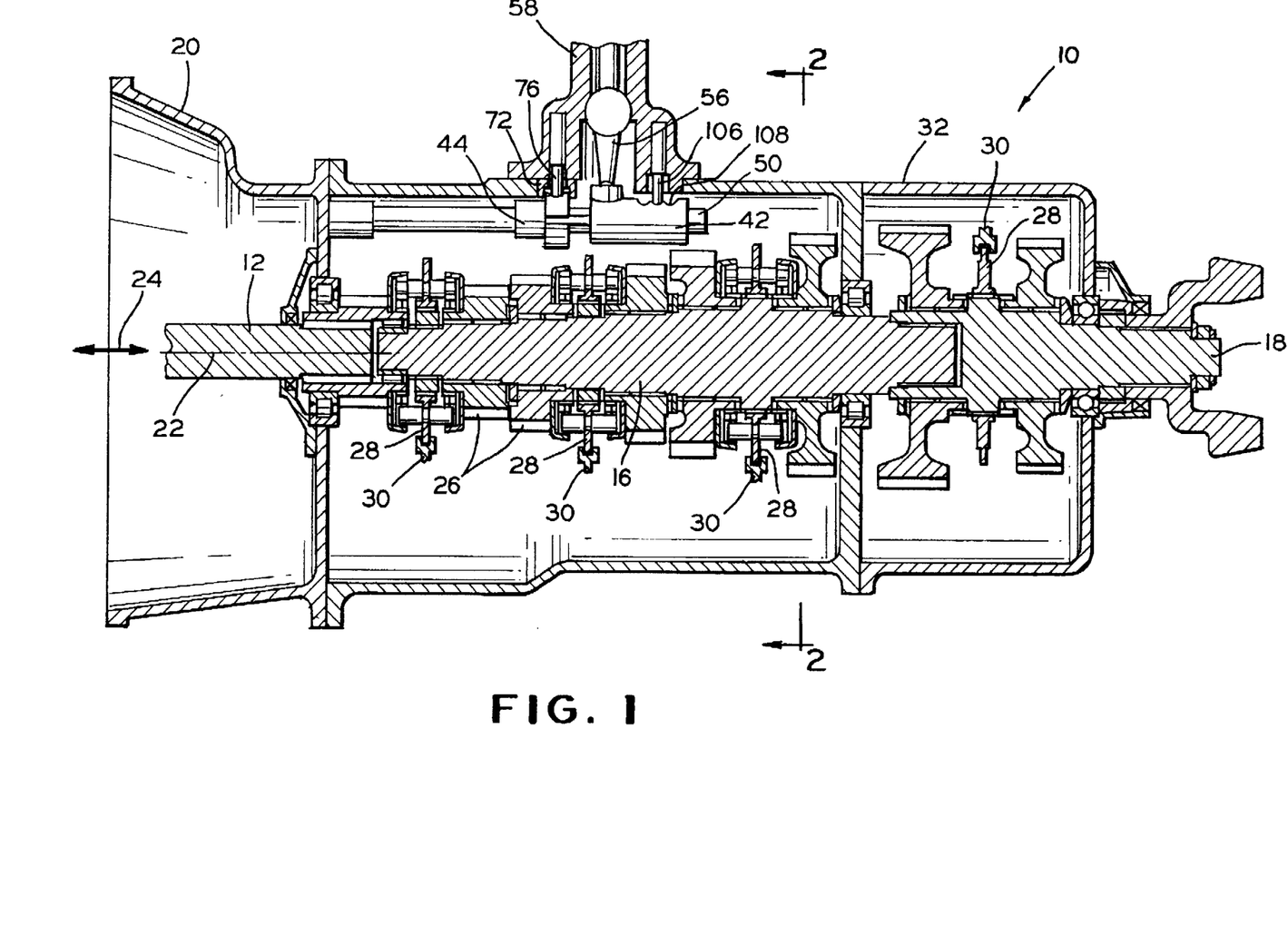
FIG. 1 is a schematic, cross-sectional view in elevation of a vehicle transmission of the invention.
Figure 2:
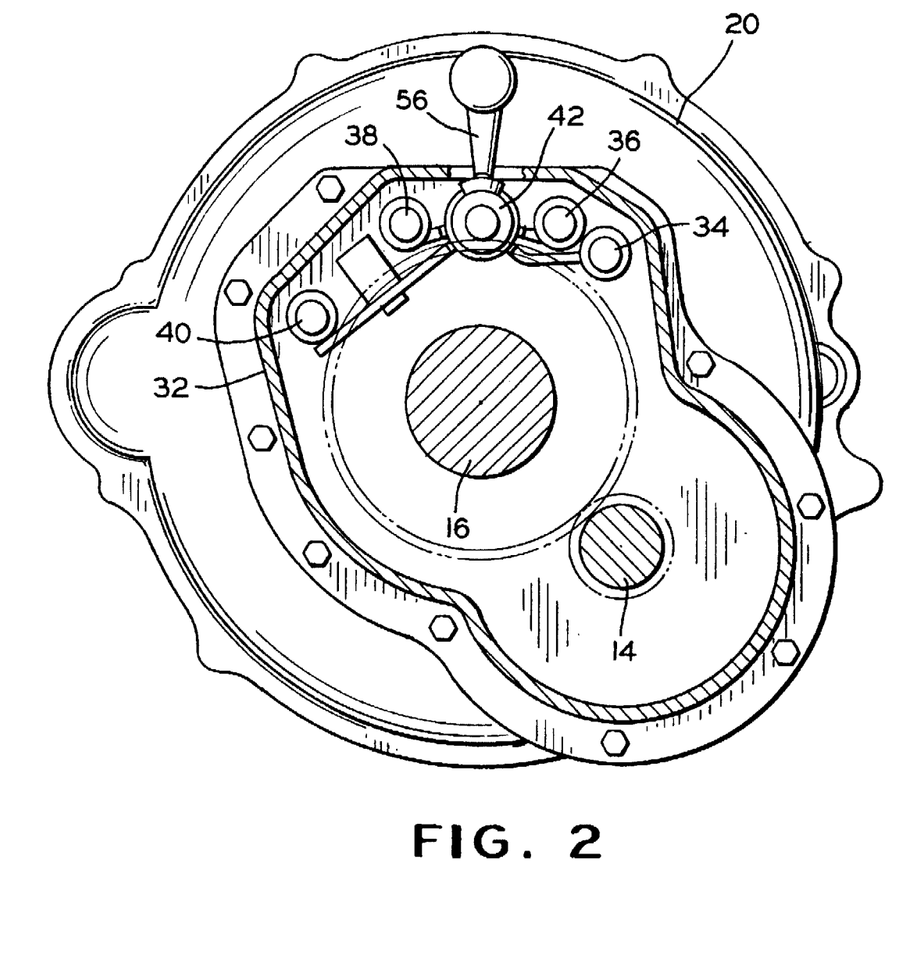
FIG. 2 is a schematic, cross-sectional view of the transmission taken generally along line 2—2 of FIG. 1.

As shown in FIGS. 1 and 2, the vehicle transmission indicated generally at 10 includes input shaft 12, countershaft 14 (shown only in FIG. 2), main shaft 16 and output shaft 18 (shown only in FIG. 1.) The input shaft is mounted for rotation about an axis 22, with the axis being oriented in the axial direction 24. The input shaft extends from within the clutch housing 20 into the transmission, and supplies torque from the vehicle engine, not shown, to the countershaft. The countershaft is aligned in the axial direction as are the mainshaft and the output shaft. The mainshaft is connected to the output shaft, which is linked to a drive shaft to supply power to the rear wheels of the vehicle. A plurality of gears 26 is selectively engageable by movement of clutch collars 28 to connect the input shaft to the output shaft in a plurality of gear ratios. The countershaft, mainshaft and output shaft and gears are all contained within the transmission housing 32. All of the elements of the transmission described so far are conventional and very well known in the art.

The clutch collars are moveable in the axial direction by means of forks 30 which are operable in the axial direction by the movement of shift rails 34, 36, 38 and 40, which are shown in FIG. 2. Although the transmission depicted is a 7-speed transmission, it is to be understood that the invention is applicable to other transmissions. Shift rail 34 can be designated the 1/R shift rail, with shift rails 36, 38 and 40 being designated the 2/3, 4/5 and 6/7 shift rails, respectively. The shift rails are shown as being spaced circumferentially apart from each other, and not positioned directly on top of the transmission. This design enables the transmission to have a lower profile than would otherwise be the case, thereby providing a compact transmission.

Figure 3:
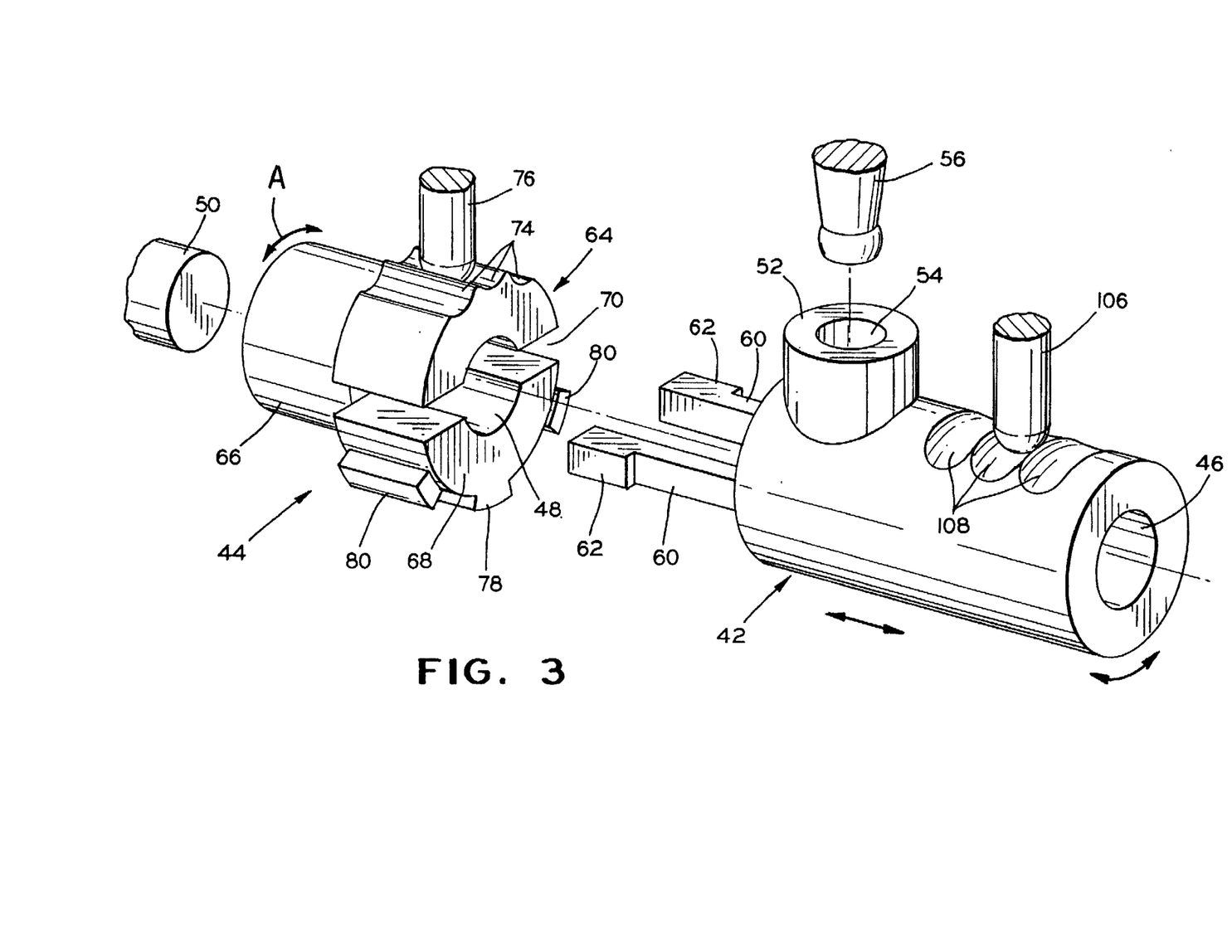
FIG. 3 is an exploded view in perspective of the idler rail, interlock and pawl of the invention.

The selection and movement of the shift rails by the vehicle operator is accomplished by means of a shift member, such as pawl 42, and an interlock 44. The shift member can be any member mounted for axial and rotational movement and suitable for engaging the interlock to rotate the interlock. As shown in FIG. 3, the pawl and interlock contain idler rail bores 46 and 48, respectively, and are mounted for rotation on the idler rail 50, which is oriented in the axial direction. The pawl can be any shift member suitable for accepting signals or direction from the vehicle operator, and for selecting the appropriate shift rail and moving the selected shift rail in the axial direction. The pawl shown has a pawl tower 52 containing tower bore 54. The tower bore is adapted to receive the shift lever 56 which is directly controlled by the vehicle operator. The shift lever can be mounted in a shift tower 58, as shown in FIG. 1.

Although the pawl is shown as being generally cylindrical, it is to be understood that it can be of any cross-sectional shape. The pawl is adapted at one end with a pair of generally parallel tangs 60 for connection with the interlock 44. The tangs have outwardly oriented prongs 62. It is to be understood that although two tangs are shown, a single tang or a multiplicity of tangs will be suitable for connection with the interlock in some embodiments of the invention.

Figure 4:
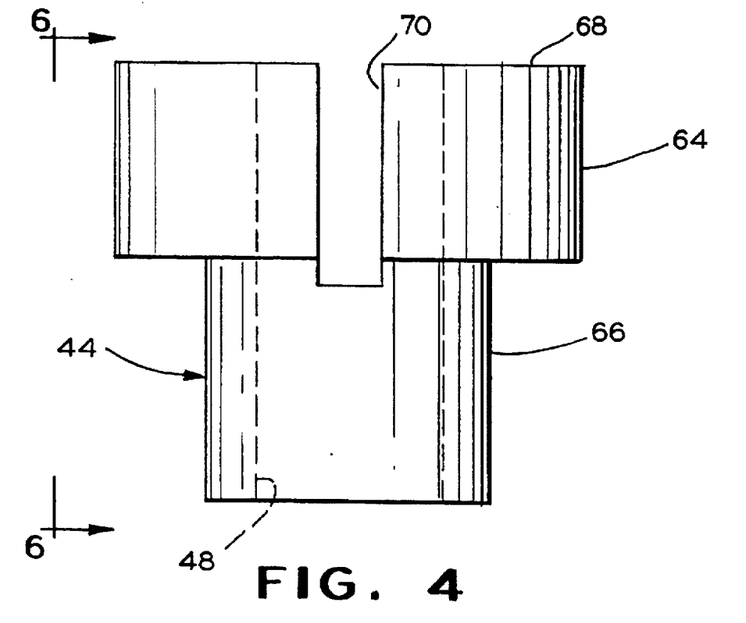
FIG. 4 is a schematic view in elevation of the interlock of the invention.
Figure 5:
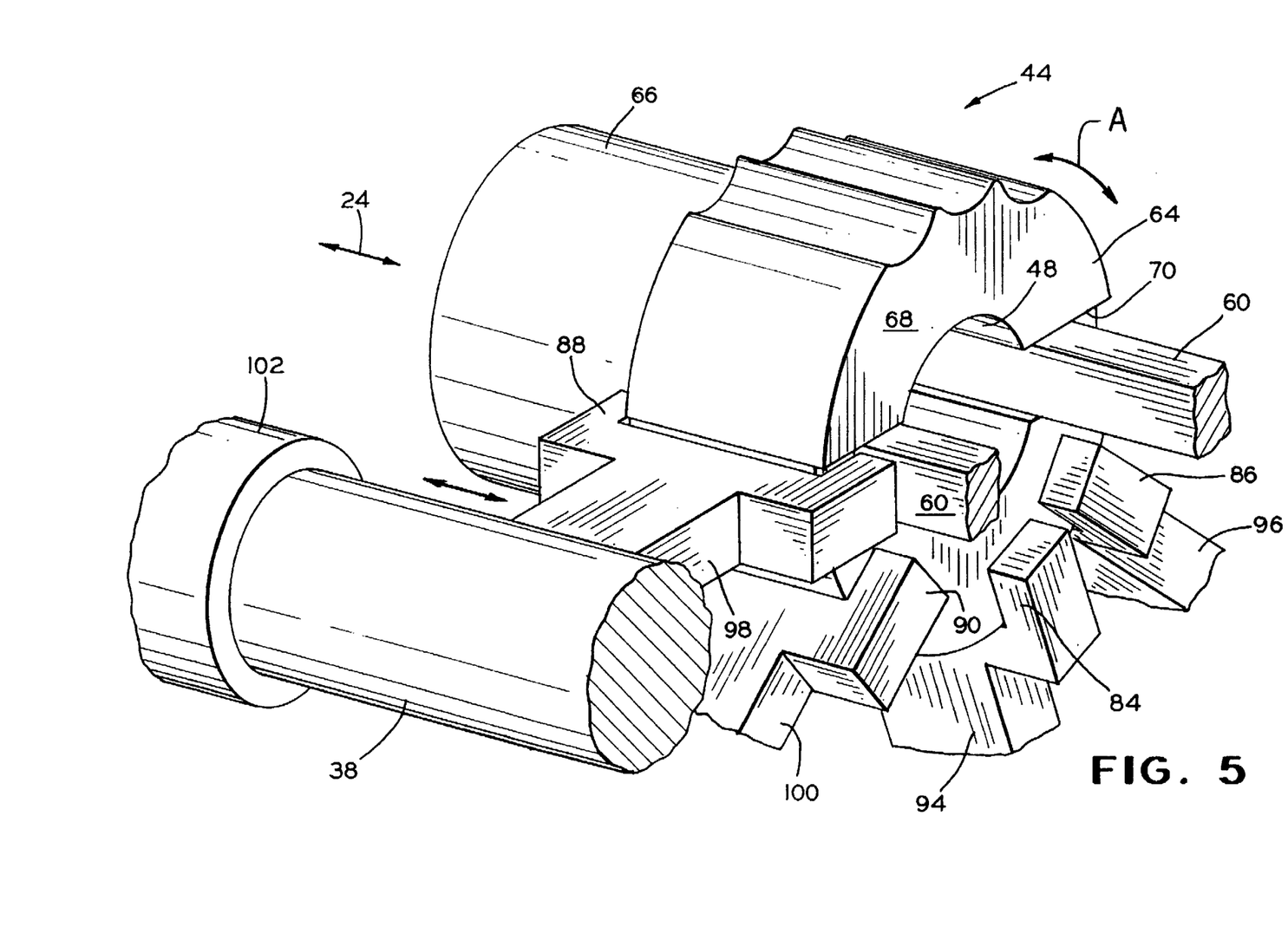
FIG. 5 is a view in perspective of the interlock and one of the shift rails of the invention.

As shown in FIGS. 3–5, the interlock 44 is comprised of generally cylindrical collar 64 and generally cylindrical shaft 66. The purpose of the interlock is to be aligned with and engage various ones of the shift rails 34, 36,38 and 40. Although the interlock shaft 66 and collar 64 are shown as being generally cylindrical, it is to be understood that other cross-sectional shapes can be employed. The face 68 of the collar contains a slot 70 which extends across the collar face along a diameter of the collar. The slot extends through the thickness of the collar and partially into the shaft, as shown in FIG. 4.

The collar and shaft both contain the interlock idler rail bore 48, and are rotatably mounted on the idler rail. The tangs 60 of the pawl fit into the slot in such a way that rotation of the pawl causes the same rotation of the interlock. Although the interlock is mounted for rotation with the pawl (see arrow A in FIGS. 3, 5, and 6) the interlock is prevented from any axial movement because the collar fits within interlock frame 72, shown in FIG. 1. Therefore, movement of the pawl in the axial direction causes the tangs 60 to move axially within the slot 70, since the interlock itself cannot move axially.

The collar can be provided with detent area 74 which is adapted to be engaged by rotational popper 76 to provide various levels of resistance to rotation, thereby enabling the vehicle operator to perceive the precise rotational location of the pawl and interlock. Other means for appraising the vehicle operator of the rotational position of the pawl and interlock can be employed.

The interlock is preferably provided with a feature which will limit the amount of rotation possible so that the interlock will not over-rotate beyond the desired alignment with the shift rails to be selected. One such means for preventing over-rotation is shown in FIG. 3 as the collar extension 78 on a circumferential arc of the collar and a pair of rotational limit stops 80. The rotational limit stops limit the rotation of the interlock to a predetermined arc. Numerous other means for preventing over-rotation can be employed.

As shown in FIG. 5 the collar 64 is engaged by a series of brackets 84, 86, 88 and 90 which are mounted on the ends of bracket arms 94, 96, 98, and 100, respectively. The bracket arms are attached to the four shift rails 34, 36, 38 and 40, respectively. For purposed of illustration, only the 4/5 shift rail 38 is shown in FIG. 5. The bracket arms can be any suitable connector for connecting the bracket to the associated shift rail. The 4/5 shift rail 38 is mounted in shift rail mounting 102 for axial movement in the axial direction 24. Any means for mounting the shift rail for movement in the axial direction can be used. As shown, movement in the axial direction of any of the brackets, such as bracket 88, causes the related bracket arm 98 to move in the axial direction, thereby causing the shift rail to move in the axial direction.

Figure 6:
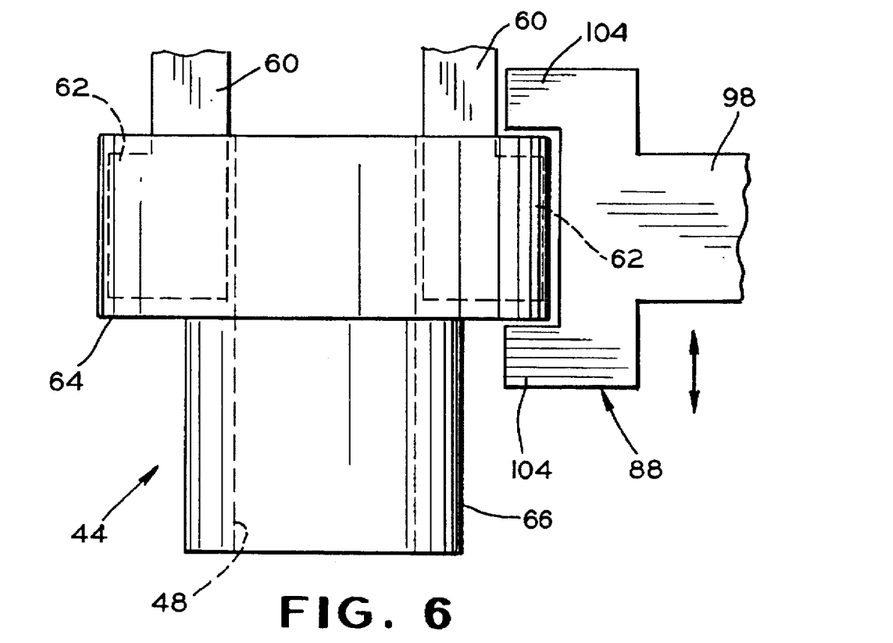
FIGS. 6 and 7 illustrate the movement of the bracket arm relative to the interlock in the axial direction.
Figure 7:
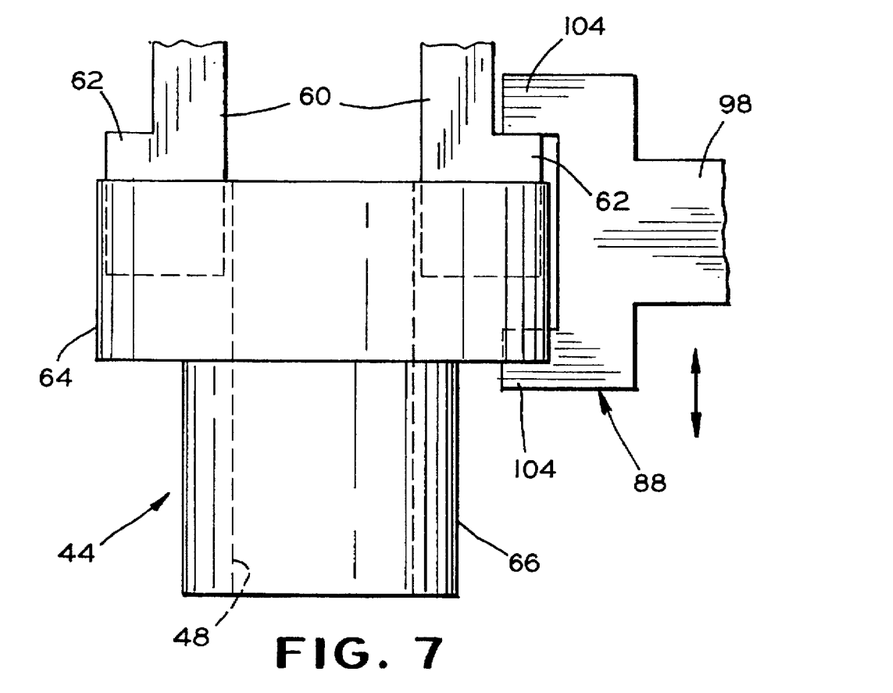

The four brackets 84, 86, 88 and 90 are provided with upper and lower flanges 104, shown in FIGS. 6 and 7, which engage the collar 64 and operate to prevent the brackets from moving in the axial direction. The only exception is that the brackets can move in the axial direction when the brackets are exactly aligned with the interlock slot 70. FIG. 5 illustrates the bracket 88 in alignment with the interlock slot 70, and therefore the bracket is free to move axially. Consequently, the 4/5 shift rail 38 can be moved axially. Movement of the 4/5 shift rail moves the associated fork and clutch collar to engage either 4th or 5th gear. It can be seen that when the 4/5 bracket 88 is in alignment with the slot, the remaining brackets (84, 86 and 100) are blocked or precluded from axial movement by the interlocking of the cylindrical interlock collar 64 and the bracket flanges 104. Therefore, only one of the brackets, and hence only one of the shift rails, can be selected at any one time. This is a primary benefit of the invention because it prevents the selection of two gears at the same time.

As shown in FIGS. 6 and 7, the prongs 62 of the tangs 60, which are positioned within the slot 70, fit within the flanges 104 of the bracket 88. Therefore, any axial movement of the interconnected pawl 42, tang 60 and prong 62 will result in the same axial movement of the bracket 88, arm 98 and shift rail 38 provided the bracket 88 is in alignment with the slot 70. FIG. 6 shows the bracket prior to movement in the axial direction, and FIG. 7 shows the bracket having been moved in the axial direction by the action of the tang and prong. The vehicle operator can discern the extent of axial movement of the interconnected pawl 42, tang 60 and prong 62 and the interconnected bracket 88, arm 98 and shift rail 38 by means of the axial poppet 106, shown in FIGS. 1 and 3. The axial poppet can be adapted to connect with detent area 108 on the pawl 42 to provide guidance to the vehicle operator to indicate the extent of axial movement.

In operation, the vehicle operator rotates the shift lever 56, thereby rotating the pawl 42 and interlock 66. Rotation of the interlock causes the slot 70 to index to a plurality of positions in alignment with the connectors (bracket arms.) When the interlock slot 70 is in alignment with one of the brackets (84, 86, 88 or 90) the one aligned bracket can be moved axially, while the remaining, unaligned brackets are prevented from moving axially. With one of the brackets in alignment with the slot, the vehicle operator is permitted to move the shift lever axially, thereby moving the pawl and tangs axially. One of the shift rails (34, 36, 38 and 40) is associated with the selected bracket, and axial movement of the bracket results in a corresponding axial movement of the associated shift rail. Shift rail movement causes a shift fork 30 to move one of the clutch collars 28 in the axial direction, thereby engaging one of the gears and providing the desired connection between the input shaft 12 and the output shaft 18.

Figure 8:
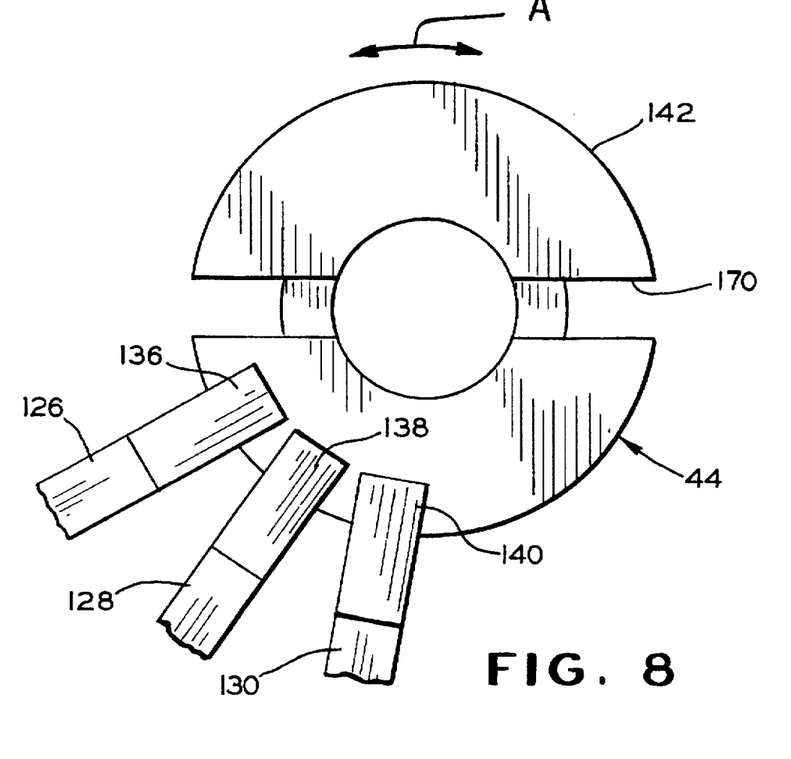
FIG. 8 is a schematic view of an embodiment of the invention in which the bracket arms are all oriented on one side of the collar.

When viewing FIGS. 2 and 5, it can be seen that the connectors, i.e., bracket arms 94, 96, 98 and 100, are positioned on both sides of the interlock, with the 1/R bracket arm 94 and the 2/3 bracket arm 96 positioned or oriented on one side of the collar and the 4/5 bracket arm 98 and the 6/7 bracket arm 100 positioned on the other side of the collar. It is to be understood that the connectors (bracket arms) can be all positioned on one side of the collar. FIG. 8 illustrates a configuration of a 5-speed interlock in which the interlock 44 contains slot 170 positioned in collar 142. The three connectors are 1/R bracket arm 126, 2/3 bracket arm 128, and 4/5 bracket arm 130. These are connected on one end to three shift rails, not shown, and on the other end to their respective brackets 136, 138 and 140. The interlock operated in a manner similar to the 7-speed transmission illustrated in FIGS. 1–7. Rotation of the interlock causes alignment of the slot 170 with one of the brackets 136, 138 or 140, thereby enabling the aligned bracket and associated shift rail to move in the axial direction.

In accordance with the provisions of the patent statutes, the principle and mode of operation of this invention have been described in its preferred embodiment. However, it should be noted that this invention may be practiced otherwise than as specifically illustrated and described without departing from its scope.

What is claimed is:

1. A transmission comprising:
   an input shaft aligned along an axial direction and mounted for rotation;
   an output shaft;
   a plurality, of gears selectively connectable between the input shaft and the output shaft for providing a plurality of gear ratios between the input shaft and the output shaft;
   a plurality of shift rails movable in the axial direction to select various ones of the plurality of gears, the shift rails having connectors operable to move the shift rails in the axial direction;
   a shift member mounted both for movement in the axial direction and for rotational movement about the axial direction;
   an interlock engageable by the shift member and mounted for rotation about the axial direction:
   where the interlock is provided with a slot;
   where rotation of the shift member rotates the interlock;
   where rotation of the interlock by the shift member enables the slot to index to a plurality of positions in alignment with the connectors; and
   where alignment of the slot with one of the connectors enables the shift rail associated with that connector to be moved in the axial direction to select one of the plurality of gears and alignment of the slot with one of the connectors precludes the other connectors from being moved in the axial direction.

2. The transmission of claim 1 in which the shift member is a pawl.

3. The transmission of claim 2 in which the pawl has a tang engaging the slot, where engagement of the tang with the slot causes the interlock to rotate upon rotation of the pawl.

4. The transmission of claim 1 in which the shift member is operable by a shift lever.

5. The transmission of claim 1 in which the interlock comprises a generally cylindrical collar with the slot positioned on one face of the collar and extending across a diameter of the collar.

6. The transmission of claim 5 in which the interlock comprises a generally cylindrical shaft connected to the collar and mounted for coaxial rotation with the collar, where the slot extends entirely through the thickness of the collar and partially into the shaft.

7. The transmission of claim 1 in which the connectors have connector arms with brackets mounted at one end, the shift member has a tang having a prong which connects with the bracket, and axial movement of the tang moves the bracket and connector arm axially, thereby moving the shift rail associated with the connector in an axial direction.

8. The transmission of claim 1 in which the shift member and the interlock are both mounted for rotation on an idler rail which is oriented in the axial direction.

9. The transmission of claim 8 in which the shift member is a pawl.

10. The transmission of claim 9 in which the pawl has a pawl tower which is engageable by a shift lever to a.) rotate the pawl to align the slot with one of the connectors and b.) move the pawl axially so that the shift rail associated with that one connector is moved axially, thereby connecting the input shaft and the output shaft with one of the plurality of gear ratios.

11. The transmission of claim 1 in which the connectors are all oriented on one side of the collar.

12. A transmission comprising:
   an input shaft aligned along an axial direction and mounted for rotation;
   an output shaft;
   a plurality of gears selectively connectable between the input shaft and the output shaft for providing a plurality of gear ratios between the input shaft and the output shaft:
   a plurality of shift rails movable in the axial direction to select various ones of the plurality of gears, the shift rails having connectors operable to move the shift rails in the axial direction;
   an idler rail oriented in the axial direction;
   a shift member mounted for rotation on the idler rail and for movement in the axial direction;
   an interlock engageable by the shift member and mounted for rotation on the idler rail:
   where the interlock is provided with a slot;
   where rotation of the shift member rotates the interlock;
   where rotation of the interlock by the shift member enables the slot to index to a plurality of positions in alignment with the connectors; and
   where alignment of the slot with one of the connectors enables the shift rail associated with that connector to be moved in the axial direction to select one of the plurality of gears.

13. The transmission of claim 12 in which the shift member is a pawl.

14. The transmission of claim 13 in which the pawl has a tang engaging the slot.

15. The transmission of claim 12 in which the interlock comprises a generally cylindrical collar with a slot positioned on one face of the collar and extending across a diameter of the collar.

16. The transmission of claim 15 in which the interlock comprises a generally cylindrical shaft connected to the collar and mounted for coaxial rotation with the collar, where the slot extends entirely through the thickness of the collar and partially into the shaft.

17. A transmission comprising:
- an input shaft aligned along an axial direction and mounted for rotation;
- an output shaft;
- a plurality of gears selectively connectable between the input shaft and the output shaft for providing a plurality of gear ratios between the input shaft and the output shaft;
- a plurality of shift rails movable in the axial direction to select various ones of the plurality of gears, the shift rails having connectors operable to move the shift rails in the axial direction;
- a shift member mounted both for movement in the axial direction and for rotational movement about the axial direction;
- an interlock engageable by the shift member and mounted for rotation about the axial direction:
  - where the interlock comprises a.) a generally cylindrical collar with a slot positioned on one face of the collar and extending along a diameter of the collar and b.) a generally cylindrical shaft connected to the collar and mounted for coaxial rotation with the collar, and where the slot extends entirely through the thickness of the collar and partially into the shaft:
  - where rotation of the shift member rotates the interlock;
  - where rotation of the interlock by the shift member enables the slot to index to a plurality of positions in alignment with the connectors;
  - where alignment of the slot with one of the connectors enables the shift rail associated with that connector to be moved in the axial direction to select one of the plurality of gears; and
  - where alignment of the slot with one of the connectors precludes the other connectors from being moved in the axial direction.

18. The transmission of claim 17 in which at least one of the connectors is oriented on one side of the collar and at least one of the connectors is oriented on the other side of the collar, and in which the connectors have connector arms with brackets mounted at one end, the shift member has a tang having a prong which connects with the bracket, and axial movement of the tang moves the bracket and connector arm axially, thereby moving the shift rail associated with the connector in an axial direction.

19. The transmission of claim 18 in which the shift member is a pawl having a pawl tower which is engageable by a shift lever to a.) rotate the pawl to align the slot with one of the connectors and b.) move the pawl axially so that the shift rail associated with that one connector is moved axially, thereby connecting the input shaft and the output shaft with one of the plurality of gear ratios.

* * * * *

UNITED STATES PATENT AND TRADEMARK OFFICE
CERTIFICATE OF CORRECTION

PATENT NO. : 5,704,252
DATED      : January 6, 1998
INVENTOR(S): John M. Loeffler It is certified that error appears in the above-indentified patent and that said Letters Patent is hereby corrected as shown below:

Column 6, Claim 12, Line 26, after "gears", insert -- , and alignment of the slot with one of the connectors precludes the other connectors from being moved in the axial direction --.

Signed and Sealed this

Twenty-fourth Day of March, 1998

Attest:

BRUCE LEHMAN

*Attesting Officer*          Commissioner of Patents and Trademarks